United States Patent
Toyama

(10) Patent No.: US 11,830,381 B2
(45) Date of Patent: Nov. 28, 2023

(54) INFORMATION PROCESSING APPARATUS, INFORMATION PROCESSING METHOD, AND RECORDING MEDIUM

(71) Applicant: CASIO COMPUTER CO., LTD., Tokyo (JP)

(72) Inventor: Chihiro Toyama, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/674,963

(22) Filed: Feb. 18, 2022

(65) Prior Publication Data

US 2022/0309939 A1 Sep. 29, 2022

(30) Foreign Application Priority Data

Mar. 24, 2021 (JP) .................................. 2021-049637

(51) Int. Cl.
| | |
|---|---|
| G09B 7/02 | (2006.01) |
| G09B 7/06 | (2006.01) |
| G06F 3/023 | (2006.01) |
| G09B 19/06 | (2006.01) |

(52) U.S. Cl.
CPC ............. *G09B 7/02* (2013.01); *G06F 3/0237* (2013.01); *G09B 7/06* (2013.01); *G09B 19/06* (2013.01)

(58) Field of Classification Search
None
See application file for complete search history.

(56) References Cited

U.S. PATENT DOCUMENTS

| 7,641,475 B2 | 1/2010 | Katsuyama et al. | |
|---|---|---|---|
| 2006/0167675 A1* | 7/2006 | Miyahira | G06F 40/268 704/2 |
| 2007/0072164 A1 | 3/2007 | Katsuyama et al. | |
| 2007/0288240 A1* | 12/2007 | Huang | G10L 13/033 704/260 |
| 2011/0231432 A1* | 9/2011 | Sata | G06F 40/242 707/769 |
| 2012/0022854 A1* | 1/2012 | Hoshino | G06F 40/268 704/9 |
| 2012/0023398 A1* | 1/2012 | Hoshino | G06F 40/242 715/256 |

(Continued)

FOREIGN PATENT DOCUMENTS

| JP | 2007094055 A | 4/2007 |
|---|---|---|
| JP | 2008203743 A | 9/2008 |

OTHER PUBLICATIONS

Japanese Office Action (and an English language translation thereof) dated Jan. 24, 2023, issued in counterpart Japanese Application No. 2021-049637.

*Primary Examiner* — Jason T Yen
(74) *Attorney, Agent, or Firm* — Holtz, Holtz & Volek PC

(57) ABSTRACT

An information processing apparatus according to an embodiment of the disclosure includes: a dictionary storage that stores headwords and dictionary contents associated with information corresponding to the headwords; an input device that inputs a character string in accordance with an input operation; and a processor that makes a question for learning the character string, based on a character string entered to the input device as a search target for a headword of the dictionary contents and an input operation of entering the character string to the input device.

6 Claims, 10 Drawing Sheets

(56) References Cited

U.S. PATENT DOCUMENTS

| | | | |
|---|---|---|---|
| 2013/0151555 A1* | 6/2013 | Miyano | H04N 5/783 |
| | | | 707/769 |
| 2013/0167023 A1* | 6/2013 | Rachi | G06F 40/10 |
| | | | 715/259 |
| 2015/0006513 A1* | 1/2015 | Mashimo | G06F 16/338 |
| | | | 707/722 |
| 2015/0106703 A1* | 4/2015 | Fraundorf | G06F 3/0484 |
| | | | 715/271 |
| 2016/0085757 A1* | 3/2016 | Rachi | G06F 16/3322 |
| | | | 707/727 |
| 2016/0379513 A1* | 12/2016 | DuQuette | G09B 5/065 |
| | | | 434/227 |
| 2017/0154546 A1* | 6/2017 | Butler | G10L 15/187 |
| 2017/0186332 A1* | 6/2017 | Ichikawa | G09B 7/02 |
| 2017/0287356 A1* | 10/2017 | Stephen | G09B 7/06 |
| 2018/0130375 A1* | 5/2018 | Booth | G09B 5/08 |
| 2021/0165849 A1* | 6/2021 | Mohri | G06F 16/958 |
| 2022/0083577 A1* | 3/2022 | Yoshida | G06F 16/3344 |

\* cited by examiner

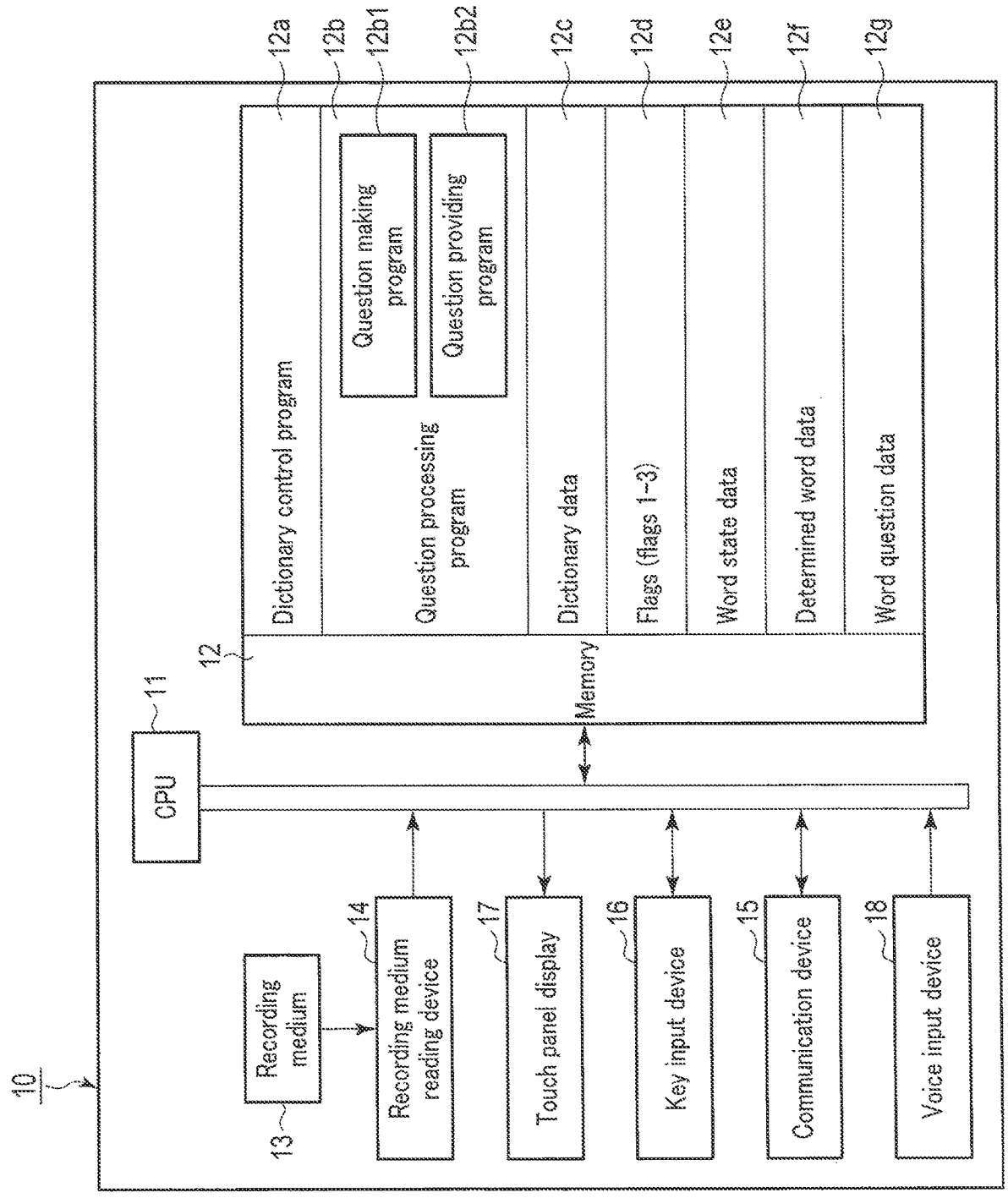
F I G. 1

| Date and time data | Question data (Hidden word, Option word) | Word meaning information |
|---|---|---|
|  |  |  |

```
●○○○英和検索
  ‡to·mor·row/təmáːyou,
   【原義:朝(morrow)に(to)→翌朝→翌日】
    ─ 图Ⓤ  Ⓥ
  ①あした、あす
  ¶ tomorrow morning [afternoon.evening]
     あすの朝[午後、晩]
  ¶ tomorrow's newspaper
```

FIG. 8

```
●
  | あいう | ABC | 例文 | 成句 |
  🔍 tomo|           [手書き][abc][検索]
  No corresponding candidate
```

FIG. 9

(A) tomo (B) tomoo [err]

(C) tomo[ ]row

FIG. 10

(A) dictional (B) dictional [del] ry (C) dictionaly [del][del] ry (D) dictiona[ ][ ]

FIG. 11

(A) dictiona (B) dictiona [4sec] ry (C) dictiona [ ] y

FIG. 12

(A) effect
(B) affect
(C) [ ]ffect

FIG. 13

(A) disk(Voice input)
(B) disk [del][del][del] esk
(C) d[ ]sk

FIG. 14

(A) see(Voice input)
(B) sea(Voice input)
(C) se[ ]

FIG. 15

INFORMATION PROCESSING APPARATUS, INFORMATION PROCESSING METHOD, AND RECORDING MEDIUM

CROSS-REFERENCE TO RELATED APPLICATIONS

This application is based upon and claims the benefit of priority from prior Japanese Patent Application No. 2021-049637, filed Mar. 24, 2021, the entire contents of which are incorporated herein by reference.

TECHNICAL FIELD

The technical field relates to an information processing apparatus, an information processing method, and a recording medium, which search for contents, such as a dictionary, in response to input of a character string.

DESCRIPTION OF RELATED ART

In many learning systems provided in information processing apparatuses such as electronic dictionaries and personal computers, a plurality of questions are prepared in advance and are displayed in order for a learner to answer, so that the learner can learn without getting bored.

There are various forms in which the questions are presented. For example, in a fill-in-the-blank question, part of a sentence or part of characters of a word are hidden and the correct character string in the hidden part is prompted to be entered. In a multiple-choice question, the correct answer is prompted to be selected from a plurality of options in answer to a question.

In a conventional learning system, it is often the case that a designer prepares questions at the stage of software design and incorporates them into a program as fixed values. That is, the questions presented by the learning system are the same regardless of who the learner is, and do not change dynamically in accordance with who the learner is.

For this reason, questions completely unrelated to the learner's learning history may be presented, or questions of the same content may be repeatedly presented, so that the learner may get bored or a sufficient learning effect may not be obtained.

In the meantime, there is known a fill-in-the-blank test question making device that dynamically makes questions (for example, see Jpn. Pat. Appln. KOKAI Publication No. 2007-094055). In the text displayed on the slide used for a lecture, the lecturer points to important points many times using a laser pointer or the like. The fill-in-the-blank test question making device automatically generates a fill-in-the-blank test question by automatically extracting a portion that is pointed to for a long time with the laser pointer and replacing a word or the like in that portion with a blank area.

Although the conventional fill-in-the-blank test question making device can dynamically make a fill-in-the-blank test question, the question is made depending on the pointing operation of the lecturer. Therefore, the fill-in-the-blank test question is not related to the learning history of each learner, and its content is the same for all learners. In this case as well, the learner may get bored or a sufficient learning effect may not be obtained.

BRIEF SUMMARY

An information processing apparatus according to an embodiment of the disclosure includes: a dictionary storage that stores headwords and dictionary contents associated with information corresponding to the headwords; an input device that inputs a character string in accordance with an input operation; and a processor that makes a question for learning the character string, based on a character string entered to the input device as a search target for a headword of the dictionary contents and an input operation of entering the character string to the input device.

BRIEF DESCRIPTION OF THE DRAWINGS

The components in the drawings are not necessarily to scale relative to each other.

FIG. 1 is a functional block diagram showing a configuration of an electronic circuit of an information processing apparatus according to an embodiment of the present disclosure.

FIG. 2 is a front view showing how an electronic dictionary of the present embodiment looks like.

FIG. 3 is a diagram showing an example of word question data of the present embodiment.

FIG. 6 is a diagram showing an example of what is displayed when a dictionary search function is executed in the present embodiment.

FIG. 7 is a diagram showing an example of what is displayed when the dictionary search function is executed in the present embodiment.

FIG. 8 is a diagram showing an example of what is displayed when the dictionary search function is executed in the present embodiment.

FIG. 9 is a diagram showing an example of what is displayed when the dictionary search function is executed in the present embodiment.

FIG. 10 is a diagram for illustrating a case where a question making event due to erroneous input occurs.

FIG. 11 is a diagram for illustrating a case where a question making event due to the deletion of an entered character occurs.

FIG. 12 is a diagram for illustrating a case where a question making event due to non-input time occurs.

FIG. 13 is a diagram for illustrating a case where a question making event does not occur.

FIG. 14 is a diagram for illustrating how a question is made when characters are entered by voice input.

FIG. 15 is a diagram for illustrating how a question is made when characters are entered by voice input.

DETAILED DESCRIPTION

Figure 2:
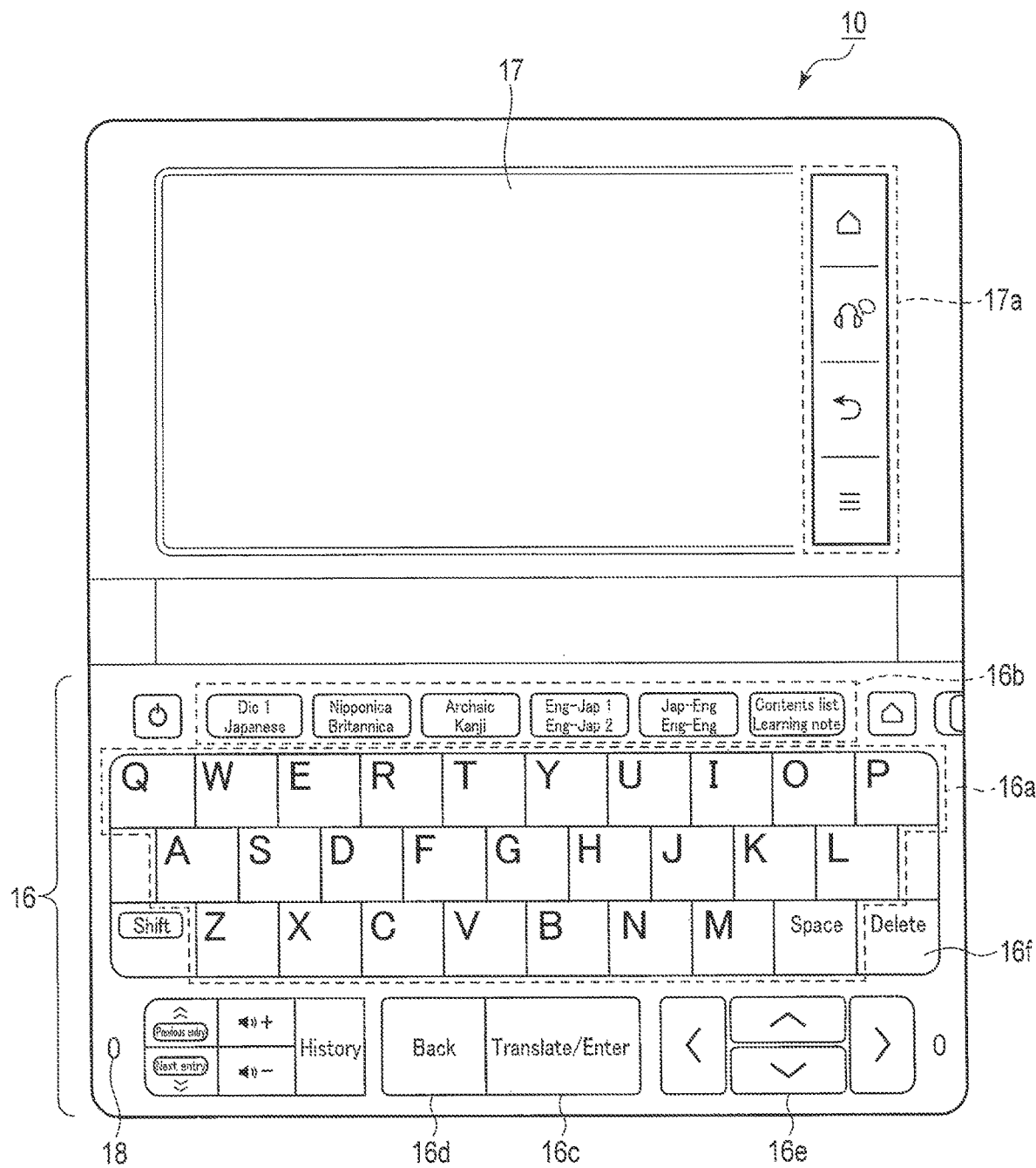

Embodiments of the present disclosure will be described with reference to the accompanying drawings.

FIG. 1 is a functional block diagram showing a configuration of an electronic circuit of an information processing apparatus according to an embodiment of the present disclosure.

In connection with the present embodiment, reference will be made to an example in which the information processing apparatus is configured as an electronic dictionary 10. The information processing apparatus can be realized as various electronic apparatuses, such as a personal computer, a smartphone, a tablet PC, or a game device, in addition to the electronic dictionary 10.

In the electronic dictionary 10, a plurality of types of dictionary contents are recorded as dictionary data. In the dictionary contents, information on at least one word meaning is registered in association with each of words having a plurality of headwords. In general, the dictionary contents included in the electronic dictionary 10 are made by a publisher or the like, include a paper printed dictionary or the like, and are thus highly reliable. Therefore, by effectively using highly reliable dictionary contents for learning, correct and effective learning effects can be expected.

The dictionary contents are not limited to dictionaries related to languages, such as English and Japanese, but include contents such as dictionaries of various fields.

The electronic dictionary 10 has a configuration of a computer in which recorded programs in various recording media or transmitted programs are read and the operation is controlled by the read programs, and the electronic circuit of the computer includes a CPU (central processing unit) 11.

The CPU 11 functions as a control device that controls the entire electronic dictionary 10. The CPU 11 controls the operation of each portion of the circuit according to a control program which is stored in a memory 12 in advance, a control program which is read from a recording medium 13 such as a ROM card into the memory 12 via a recording medium reading device 14, or a control program which is downloaded from an external device (server or the like) from a network (not shown) such as the Internet and read into the memory 12.

The control program stored in the memory 12 is activated in response to an input signal entered by the user's operation of a key input device 16, an input signal entered by the user's operation of a touch panel display 17, or a connection communication signal supplied from an external recording medium 13, such as an EEPROM®, a RAM or a ROM coupled via the recording medium reading device 14.

The memory 12, the recording medium reading device 14, a communication device 15, the key input device 16, the touch panel display 17, a voice input device (microphone) 18, etc. are coupled to the CPU 11.

The control program stored in the memory 12 includes a dictionary control program 12*a*, a question processing program 12*b*, or the like. The dictionary control program 12*a* is a program for controlling the operation of the entire electronic dictionary 10. The dictionary control program 12*a* realizes a dictionary search function for searching dictionary contents and displaying information, based on a character string entered with the input device (key input device 16, touch panel display 17, or voice input device 18). The dictionary control program 12*a* includes a handwritten character recognition program for recognizing handwritten characters written on the touch panel display 17, and a voice recognition program for recognizing voice input from the voice input device 18.

The question processing program 12*b* includes a question making program 12*b*1 that makes a question for word learning by using processing results of the dictionary search function, and a question providing program 12*b*2 that provides a question made by the processing of the question making program 12*b*1 in the learning mode. The question processing program 12*b* is a program that is added to the electronic dictionary 10 and cooperates with the existing dictionary control program 12*a* and that controls the electronic dictionary 10 as a learning system using the processing results of the dictionary search function.

In general, the electronic dictionary 10 used for an ordinary learning purpose searches the dictionary contents in response to input of a character string such as a word by use of the dictionary search function and displays various kinds of information regarding the word corresponding to the input word (character string). The learner can know the word meaning (meaning) of the displayed word and information related to the word. The electronic dictionary 10 of the present embodiment makes a question for learning an entered character string (word) by use of the processing results of the dictionary search function, based on the character string entered for dictionary search and the operation executed for entering the character string.

Where the dictionary search function of the electronic dictionary 10 is used, words to be searched for differ depending upon learners, and the input operations performed for the search of character strings also differ. During the input operation of a character string, for example, there may be a situation in which a character string that does not have a headword in the dictionary content is entered (erroneous input), a situation in which a character that has already been entered is deleted because that character is erroneously entered (deletion), and a situation in which entering a certain character requires a longer time than a reference value required for entering other characters (non-input time). The input operations of a character string differ depending upon learners. Further, if the above-mentioned erroneous input, deletion, non-input time, or the like occurs when a character string is entered, this may indicate that the learner does not sufficiently recognize what character should be entered at the character position.

In the present embodiment, a question is made in accordance with the character string entered by the learner as a search target and the operation which the learner performs for entering that character string, so that the question can be dynamically changed in accordance with how the learner uses the dictionary search function. In addition, a question suitable for the learner can be made, and a question with a high learning effect can be provided.

The questions made by the electronic dictionary 10 of the present embodiment include, for example, a fill-in-the-blank question that presents a hidden word in which some characters of a word are hidden, and a multiple choice question that includes a correct word and similar words similar to the correct word. As long as questions can be made by using the processing results of the dictionary search function, questions of other formats can be made.

The memory 12 stores dictionary data 12*c*, flags 12*d*, word state data 12*e*, determined word data 12*f*, word question data 12*g*, etc.

The dictionary data 12*c* includes, for example, a plurality of dictionaries such as an English-Japanese dictionary, a Japanese-English dictionary, an English-English dictionary, an English-Chinese dictionary, and a Japanese dictionary, and a database containing dictionary contents such as a plurality of kinds of dictionaries. The dictionary data 12*c* is associated with word meaning information for explaining the meaning (word meaning) corresponding to each headword for each dictionary.

The dictionary data 12*c* does not have to be included in the main body of the electronic dictionary 10; it may be stored in an external device (server or the like) that is accessible through a network.

The flags 12*d* monitor an operation in which a character string is entered for dictionary search, and indicate whether or not an event used for question making has occurred. It is assumed that the events used for question making (hereinafter referred to as question making events) include the above-mentioned erroneous input at the time of input of a character string, deletion of already entered characters, and non-input time indicating that the input of a certain character takes time. The flags 12d include flags 1, 2 and 3. The flags 12d are set such that "flag 1=1" if there is erroneous input, "flag 2=1" if there is character deletion, and "flag 3=1" if there is non-input time. The default of the flags 1 to 3 is "0", and where "flags 1 to 3=0", this state indicates that the question making event does not occur during the input operation.

The word state data 12e is data indicating how a character string is when a question making event occurs.

The determined word data 12f is data indicating a character string (word) that is used in the dictionary search for finally displaying a dictionary search result in the past dictionary search processing. In the determined word data 12f, a character string (word) that is used for the dictionary search using the dictionary search function performed for at least one time (last time) is stored. In the determined word data 12f, character strings (words) that are used for the dictionary search performed for a predetermined number of times (for example, the last five times) may be stored, or character strings (words) that are used for the dictionary search performed for a predetermined period (for example, in the current day, in the past week, in the past month, etc.) may be stored.

The word question data 12g is data indicating a question that is made based on the processing results (word state data 12e and determined word data 12f) of the dictionary search function (see FIG. 3).

The communication device 15 performs communication control that communicates with other information processing apparatuses via a network such as the Internet or a LAN (Local Area Network), or performs communication control of short-range wireless communications with other information processing apparatuses located at a short distance by using Bluetooth® or Wi-Fi®.

In the electronic dictionary 10 configured in this manner, the CPU 11 controls the operation of each portion of the circuit in accordance with the instructions described in various programs such as the dictionary control program 12a and the question processing program 12b, and the functions described in the operation description set forth below are realized with the software and the hardware cooperating with each other.

FIG. 2 is a front view showing how the electronic dictionary 10 of the present embodiment looks like.

In the case of the electronic dictionary 10 shown in FIG. 2, a CPU 11, a memory 12, a recording medium reading device 14, a communication device 15 and a voice input device 18 are housed in the lower portion of the apparatus main body, which is opened or closed, and a key input device 16 is provided on the lower portion. A touch panel display 17 is provided on the upper portion of the apparatus main body.

The key input device 16 includes character input keys 16a, dictionary select keys 16b with which various dictionaries and various functions can be selected, a [Translate/Enter] key 16c, a [Back] key 16d, and cursor keys (up/down/left/right keys) 16e, a Delete key 16f, a power button, and various other function keys.

Various menus, buttons 17a, etc. are displayed on the touch panel display 17 in accordance with various functions to be executed. On the touch panel display 17, a touch operation for selecting various menus and buttons 17a by using a pen, for example, can be performed, and handwritten character input for entering characters can also be performed.

In the handwritten character input, when a pattern representing a character is handwritten in the handwritten character input area of the touch panel display 17 with the pen, character recognition processing is executed for that pattern. Characters for patterns obtained by the character recognition processing are displayed on the character input area of the touch panel display 17 in a similar manner to that in which the characters entered by the operation of the character input keys 16a of the key input device 16 are displayed. Therefore, a character string used for dictionary search can be entered based on handwritten characters on the touch panel display 17.

The electronic dictionary 10 enables characters to be entered by voice. The voice input device 18 inputs voice spoken by the learner. Voice recognition processing is executed for the input voice, and the character string corresponding to the spoken voice is input. The characters of an utterance obtained by the voice recognition processing are displayed in the character input area of the touch panel display 17 in a similar manner to that in which the characters entered by the operation of the character input keys 16a of the key input device 16 are displayed. Therefore, a character string used for dictionary search can be entered based on handwritten characters on the touch panel display 17.

FIG. 3 is a diagram showing an example of the word question data 12g of the present embodiment.

In the word question data 12g, date and time data, question data, and word meaning information are stored, for example, in association with each question.

The date and time data indicates, for example, the date and time when a question is made. That is, the date and time data indicates the date and time when the [Translate/Enter] key 16c is pressed after a character string is entered in the dictionary search function.

The question data is data indicating a question that is made based on a character string (word) entered for dictionary search and the input operation of the character string and that is presented to the learner in the learning mode. In the case of a fill-in-the-blank question, a character string (word) that is generated based on a question making event at the time of the character string input operation for a character string (word) entered for dictionary search by the dictionary search function is displayed, with a portion of the character string (word) being hidden. In the case of a multiple choice question, data indicates a question in which a correct word entered for dictionary search and a similar character string generated by replacing a portion of the correct word based on the question making event at the time of input operation of the character string are shown, and this question is presented to the learner in the learning mode.

The word meaning information is information corresponding to a headword which is searched for based on a character string (word) entered for dictionary search and which is displayed on the touch panel display 17 as a search result. The word meaning information can be used as a hint to the learner when the learner answers the fill-in-the-blank question (hidden word) or the multiple choice question.

Next, a description will be given of an operation of the electronic dictionary 10 of the present embodiment.

Figure 4:
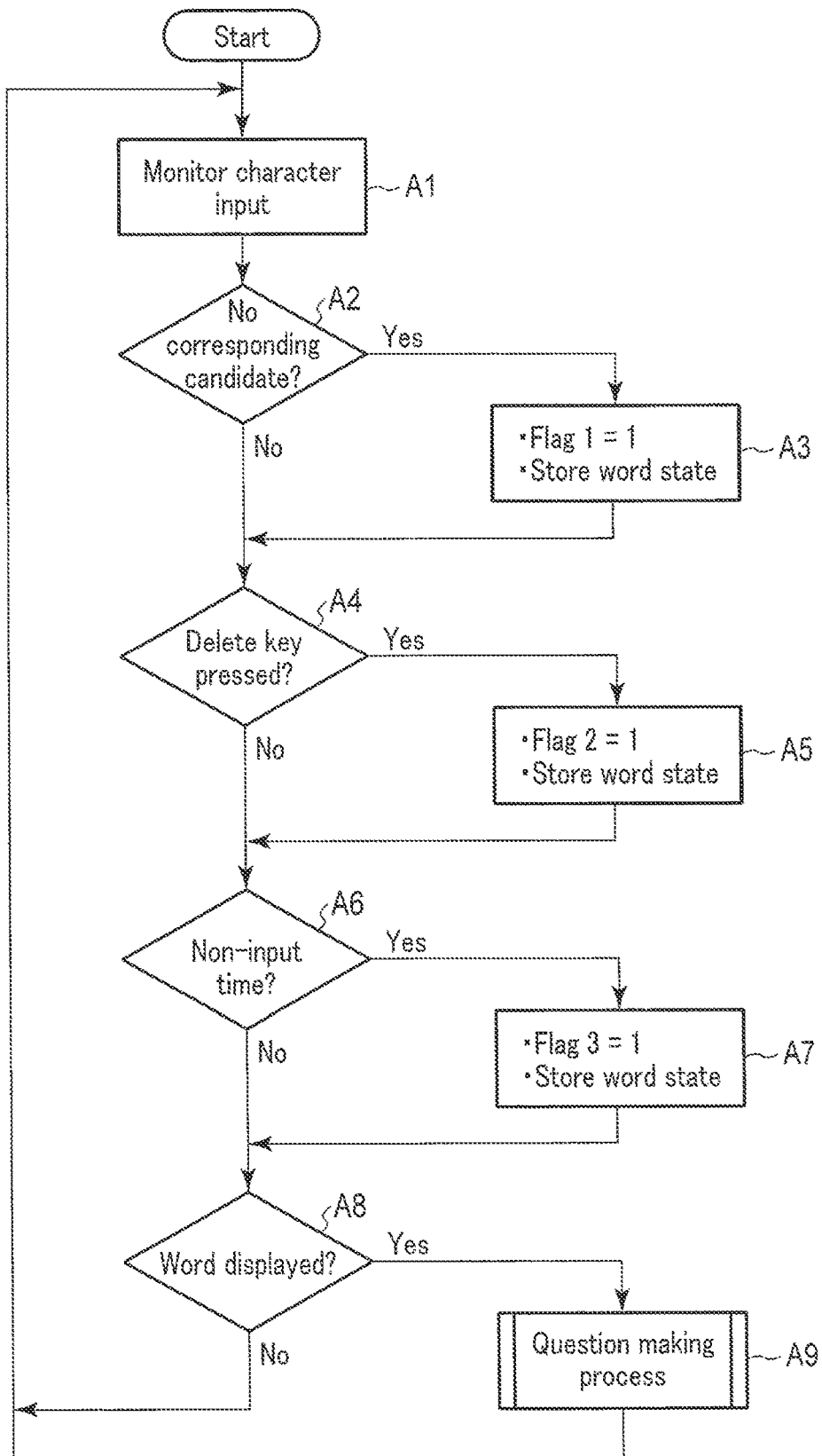
FIG. 4 is a flowchart for illustrating how a question processing program (question making program) of the electronic dictionary of the present embodiment performs question processing.
Figure 5:
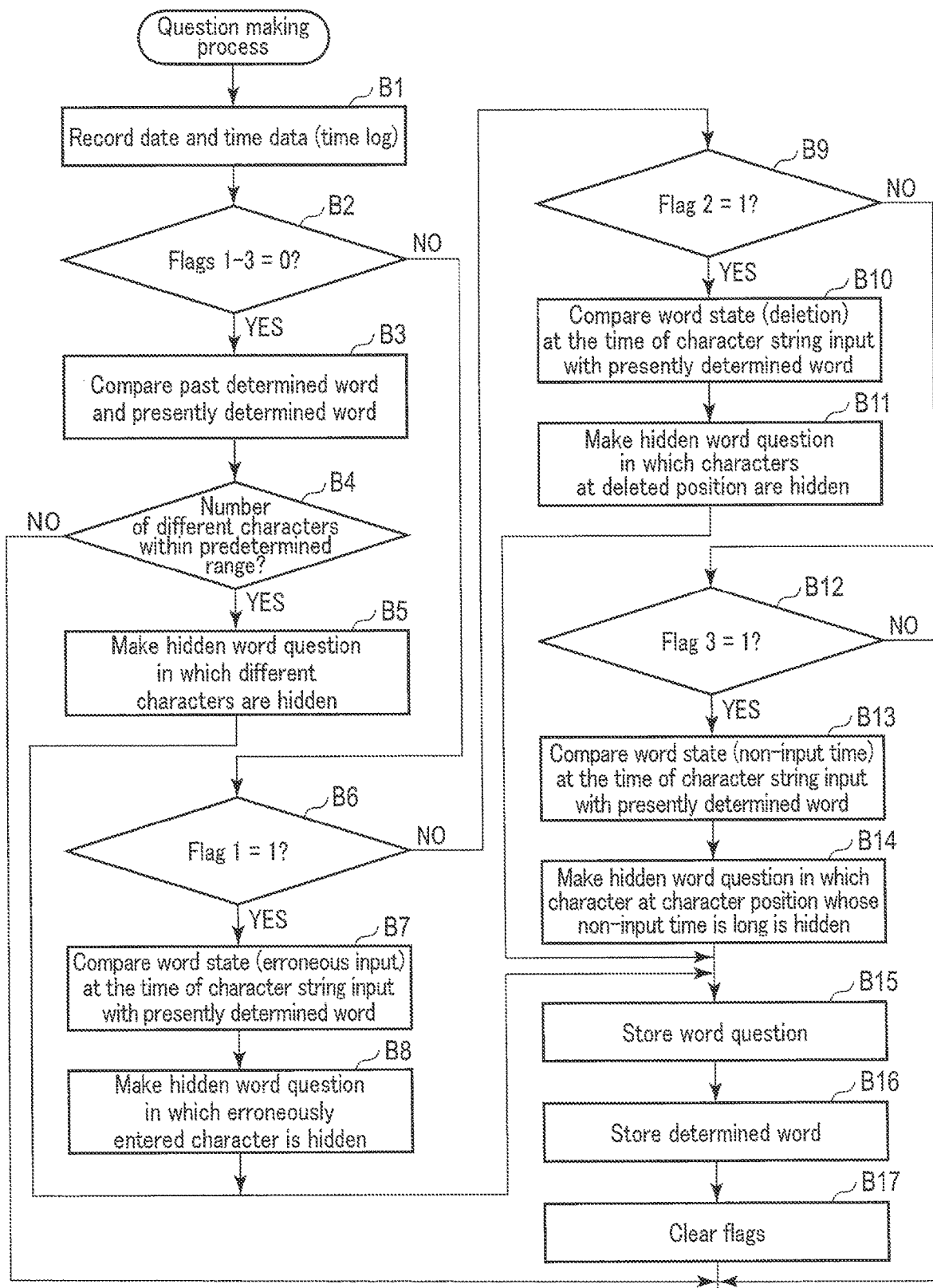
FIG. 5 is a flowchart showing details of the question making process performed in the question processing shown in FIG. 4.

FIG. 4 is a flowchart for illustrating how the question processing program 12b (question making program 12b1) of the electronic dictionary 10 of the present embodiment performs question processing. FIG. 5 is a flowchart showing details of the question making process performed in the question processing shown in FIG. 4. FIG. 6, FIG. 7, FIG. 8 and FIG. 9 are diagrams showing an example of what is displayed on the touch panel display 17 when the dictionary search function is executed in the present embodiment.

When the dictionary search function is executed according to the dictionary control program 12*a*, the CPU 11 causes the touch panel display 17 to display a dictionary search screen. When characters are entered, for example, by a key operation of the character input keys 16*a*, the CPU 11 causes the characters to be displayed in the input character area of the dictionary search screen. Also, the CPU 11 executes a search in which the headwords of the dictionary contents of the dictionary data 12*c* are searched based on the entered characters (character string).

Let it be assumed that English-based dictionaries are used as the dictionary contents to be searched, and the spelling of an English word is entered, character by character, by operating the character input keys 16*a* to search for the target English word. A specific English-Japanese dictionary can be designated as a search target by selecting a dictionary with the dictionary selection keys 16*b*.

Even if the spelling of the English word is not completely entered, the CPU 11 executes a search of the dictionary contents, based on the entered character string, each time one character is entered, and causes search result candidates to be displayed as a list on the dictionary search screen.

For example, where the English word "tomorrow", which means "明日" in Japanese, is searched for, all eight characters do not have to be entered. For example, when the first four characters "tomo" are entered, the search result candidates searched for based on the entered character string "tomo" are displayed as a list, as shown in FIG. 6.

Figures 6, 7:
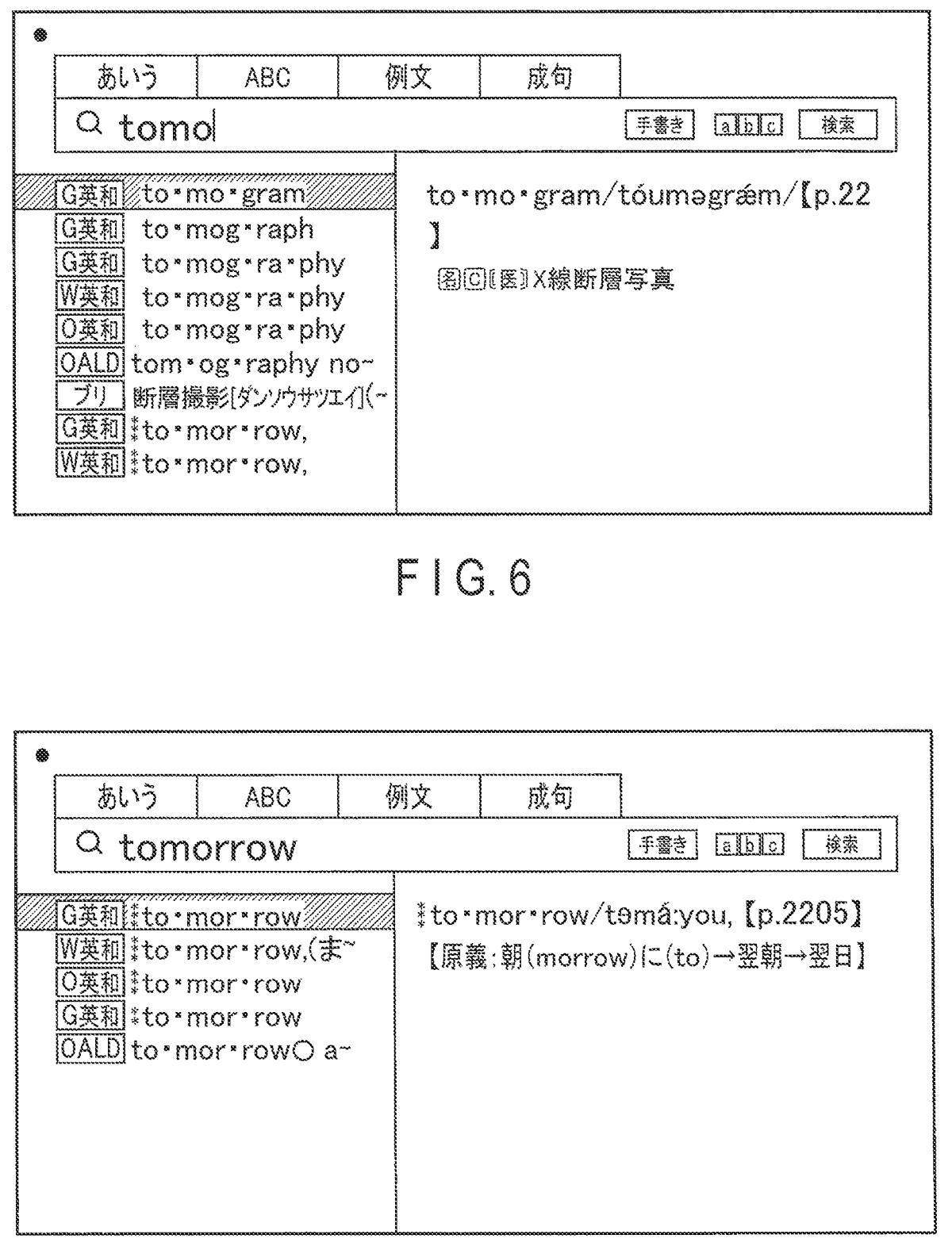

In this state, the remaining 4 characters "rrow" are additionally entered and the [Translate/Enter] key 16*c* is pressed for the character string "tomorrow", as shown in FIG. 7. As a result, information on the search results corresponding to "tomorrow" can be displayed on the touch panel display 17. FIG. 8 shows an example of information which is the dictionary search result for the entered character string "tomorrow" and which is registered in correspondence to the headword "tomorrow" of the dictionary content. In this case, the character string (word) "tomorrow" used in the dictionary search for finally displaying the dictionary search result is set as the determined word.

In the list of search result candidates shown in FIG. 6, the down key of the cursor keys 16*e* is pressed seven times to select the search candidate "tomorrow", and the [Translate/Enter] key 16*c* is pressed. By so doing, information on the search results corresponding to "tomorrow" can be displayed on the touch panel display 17 in the same manner as shown in FIG. 8.

On the other hand, the CPU 11 monitors the character input performed for the dictionary search processing, by the question processing based on the question processing program 12*b* (step A1). Each time one character is entered, the CPU 11 determines whether or not a question making event used for question making has occurred.

For example, let it be assumed that the first four characters "tomo" are entered and then the character "o" is entered. Where the CPU 11 searches the dictionary contents based on the entered character string "tomoo", there is no English word starting with "tomoo", and the CPU 11 cannot search for a headword corresponding to the character string "tomoo".

As shown in FIG. 9, the CPU 11 displays "No corresponding candidate" on the dictionary search screen of the touch panel display 17 with respect to the entered character string "tomoo", thereby notifying the user that the dictionary contents do not contain a search candidate.

In this case, in the word processing, the CPU 11 determines that there is no corresponding candidate in the dictionary search performed in accordance with the character input (step A2, Yes). That is, the CPU 11 determines that a question making event due to erroneous input has occurred. The CPU 11 sets "flag 1=1" in the flags 12*d* and stores word state data 12*e* indicating the state of the character string taken when the question making event due to erroneous input occurs (step A3).

FIG. 10 is a diagram for illustrating a case where a question making event due to erroneous input occurs. In (A), FIG. 10 shows an entered character string "tomo" for which a search candidate exists. Where the question making event due to erroneous input occurs by additionally entering the character "o" to the character string shown in (A) of FIG. 10, the word state data 12*e* shown in (B) of FIG. 10 is stored. That is, the word state "tomoo[err]" is stored indicating that erroneous input has occurred due to the input of the fifth character.

It is assumed that in the subsequent dictionary search processing, the character string "tomorrow" is entered. In this case, search results corresponding to "tomorrow" are displayed on the touch panel display 17 by the operation of the [Translate/Enter] key 16*c*.

Next, a description will be given of a case where a question making event due to the deletion of entered characters occurs.

Where the CPU 11 determines that an entered character has been deleted by the operation of the Delete key 16*f* (step A4, Yes), the CPU 11 determines that a question making event due to character deletion has occurred, sets "flag 2=1" in the flags 12*d*, and stores the word state data 12*e* indicating the state of the character string taken when the question making event due to character deletion occurs (step A5).

FIG. 11 is a diagram for illustrating a case where a question making event due to the deletion of an entered character occurs. In (A), FIG. 11 shows an entered character string "dictional". For example, let it be assumed that after the character string "dictional" is entered, the character "l" entered last is deleted and the character string "ry" is entered. In this case, the word state data 12*e* shown in (B) of FIG. 11 is stored. That is, "dictional[del]ry" is stored indicating that the character entered as the ninth character is deleted and then the character string "ry" is entered.

Where the 9th and 10th characters "ly" are deleted and the character string "ry" is entered after the character string "dictionaly" is entered, "dictionaly[del] [del]ry" is stored as the word state data 12*e*, as shown in (C) of FIG. 11.

Next, a description will be given of a case where a question making event due to non-input time occurs.

Where the CPU 11 determines that the time from the input of the last character to the input of the next character is equal to or longer than a preset reference value when the characters are sequentially entered by the key operation of the character input keys 16*a* (Step A6, Yes), the CPU 11 determines that a question making event due to non-input time has occurred, sets "flag 3=1" in the flags 12*d*, and stores the word state data 12*e* indicating the state of the character string taken when the question making event due to the non-input time occurs (step A7).

The non-input time may be set to a predetermined reference value (for example, 1 second) or to an arbitrary time the user sets in the setting operation of the electronic dictionary 10. The times between the input operations of characters when a character string is entered for dictionary search may be recorded as a history, and the reference value may be dynamically changed based on the average value of the times of character input. For example, a time that is predetermined times longer (for example, 5 times longer) than the average value is set as a reference value. Thus, a non-input time can be appropriately determined in accordance with the character input speed, which differs depending on the user of the electronic dictionary 10.

FIG. 12 is a diagram for illustrating a case where a question making event due to non-input time occurs. In (A), FIG. 12 shows an entered character string "dictiona". For example, let it be assumed that it takes 4 seconds from the input of the character string "dictiona" to the input of the next character "r". In this case, the word state data 12e shown in (B) of FIG. 12 is stored. That is, "dictiona[4 sec]ry" is stored indicating that a non-input time (4 seconds) has occurred before the 9th character is entered.

Where the [Translate/Enter] key 16c is pressed in the dictionary search processing, and the instruction to display information corresponding to the entered character string is given (step A8, Yes), the electronic dictionary 10 executes a question making process (FIG. 5), using processing results of the dictionary search function.

The CPU 11 records date and time data (time log) indicating the date and time of the question making in the word question data 12g (step B1). For example, in the case of 10:20:40 on Sep. 17, 2020, "2020 0917 1020 40" is retained as a numerical value.

Next, the CPU 11 refers to the word state data 12e and executes question making in accordance with the flags 1 to 3.

In the case of "flag 1=1" indicating that there is an erroneous input (step B6, Yes), the CPU 11 compares the word state (erroneous input) at the time of character string input indicated by the word state data 12e with a presently determined word (i.e., a word displayed as information on the character string entered by the operation of the [Translate/Enter] key 16c) (step B7), and makes a hidden word question in which the erroneously entered character is hidden (step B8).

For example, where the word state data 12e "tomoo[err]" shown in (B) of FIG. 10 is stored, this indicates that an erroneous input has occurred due to the input of the fifth character. The CPU 11 compares the entered character string with the determined word "tomorrow" and makes a hidden word question "tomo[ ]row" in which the "r" at the character position of the fifth character is hidden, as shown in (C) of FIG. 10.

Where there is erroneously entered character in the character string (word) entered for dictionary search, it may be the case that the learner does not remember the exact spelling of the word. Therefore, a question having a high learning effect for the learner can be made by making a hidden word question in which the character position where erroneous input occurs at the time of input of a character string (word) is hidden.

In the case of "flag 2=1" indicating that a character has been deleted (step B9, Yes), the CPU 11 compares the word state (deletion) at the time of character string input indicated by the word state data 12e with a presently determined word (step B10) and makes a hidden word question in which the characters at the deleted position are hidden (step B11).

For example, where the word state data 12e "dictionaly[del][del]ry" shown in (C) of FIG. 11 is stored, this indicates that the entered 9th and 10th characters have been deleted. Based on the comparison with the determined word "dictionary", the CPU 11 makes a hidden word question "dictiona[ ][ ]" in which "ry" at the character positions of the 9th and 10th characters is hidden, as shown in (D) of FIG. 11.

Where the word state data 12e "dictional[del]ry" shown in (B) of FIG. 11 is stored, a hidden word question "dictiona[ ]y" is made in which "r" at the deleted character position is hidden, in the same manner as described above.

Where a character is deleted from the character string (word) entered for dictionary search, it may be the case where the learner does not remember the exact spelling of the word. In this case, the learner enters a character erroneously and then delete the erroneously entered character. Therefore, a question having a high learning effect for the learner can be made by making a hidden word question in which the character position where an entered character is deleted at the time of input of a character string (word) is hidden.

In the case of "flag 3=1" indicating that there is a non-input time (step B12, Yes), the CPU 11 compares the word state (non-input time) at the time of character string input indicated by the word state data 12e with a presently determined word (step B13) and makes a hidden word question in which the character at the character position whose non-input time is longer than the reference value is hidden (step B14).

For example, where the word state data 12e "dictiona[4 sec]ry" shown in (B) of FIG. 12 is stored, this indicates that the input of the ninth character required a longer time than the reference value. Based on the comparison with the determined word "dictionary", the CPU 11 makes a hidden word question "dictiona[ ]y" in which "r" at the character position of the ninth character is hidden, as shown in (C) of FIG. 12.

If the input of a certain character takes time when a character string (word) is entered for dictionary search, it may be the case where the learner does not remember the exact spelling of the word and thinks a little before entering that character. Thus, a question having a high learning effect for the learner can be made by making a hidden word question in which the character position where character input takes time at the time of input of a character string (word) is hidden.

In the case of "flags 1 to 3=0" indicating that no question making event occurs in the input operation (steps B2, Yes), the CPU 11 compares the determined word (past determined word) indicated by the determined word data 12f and used for the dictionary search for finally displaying the dictionary search result in the past dictionary search processing with the determined word (presently determined word) in the present dictionary search function (step B3).

The CPU 11 determines whether the number of different characters between the past determined word and the presently determined word is within a predetermined range. Where the number of different characters is not within the predetermined range (step B4, No), the process is terminated on the assumption that a question using the past determined word need not be made.

On the other hand, where the number of different characters is within the predetermined range (step B4, Yes), the CPU 11 makes a hidden word question in which the different characters are hidden (step B5).

FIG. 13 is a diagram for illustrating a case where a question making event does not occur.

For example, in the learning using the dictionary search function of the electronic dictionary 10, English words having similar spellings are often looked up in succession. By way of example, it is assumed that the English word looked up last time is "effect" shown in (A) of FIG. 13, and the English word looked up this time is the "affect" shown in (B) of FIG. 13. If the predetermined range of the number of different characters is "3", the number of different characters between "effect" and "affect" is "1". In this case, as shown in (C) of FIG. 13, the CPU 11 makes a hidden word question "[ ]ffect" in which the first character is hidden as the different character. In step B15 described later, one or both of the word meaning information "effect" and the word meaning information "affect" are recorded in the word question data 12g together with the hidden word, in association with the hidden word question.

Further, for example, where the English word looked up last time is "patient" and the English word looked up this time is "patiently", the number of different characters is "2", so that a hidden word question "patient[ ] [ ]" in which the different characters of "patiently" are hidden can be made.

In the above description, reference was made to the case where a hidden word question is made based on the comparison with the English word looked up last time, but this is not restrictive. Where words (past determined words) corresponding to a predetermined number of times are stored in the determined word data 12f, or where a plurality of words used in the dictionary search executed in a predetermined period are stored, a hidden word question can be made by comparing a presently determined word with each of the past determined words in the same way as described above.

Thus, a question can be made for words that were looked up several times in the past or for words that were looked up for a predetermined period, for example, in the current day, in the past week, or in the past month. Therefore, a question can be made in accordance with how each learner learns using the dictionary search function of the electronic dictionary 10.

When a question is made, the CPU 11 stores it in the word question data 12g in association with the date and time data, the question data and the meaning information (step B15). Further, the CPU 11 stores the presently determined word in the determined word data 12f so that it can be used as the last determined word (step B16).

The CPU 11 clears each flag of the flags 12d (flags 1 to 3=0), and ends the question making process.

In the above description, reference was made to the case where a question is made by checking the flags in the order of flag 1, flag 2 and flag 3, but a plurality of question making events may occur (the plurality of flags are set as "1") when one word (character string) is entered for dictionary search. Therefore, the priority of the three question making events, namely erroneous input, deletion and non-input time, may be different from that of the above-mentioned example, or question making processes due to a plurality of question making events may be combined with one another.

In the above description, reference was made to the example in which characters are entered using the character input keys 16a of the key input device 16. This, however, is not restrictive. When characters are entered by voice input, a hidden character question can be made in the same manner as described above.

For example, let it be assumed that the utterance is intended to be "desk" in order to look up the English word which means " 机 ", but the utterance is recognized as "disk" by voice recognition processing and entered as such, as shown in (A) of FIG. 14.

In this case, it is assumed that "isk" is deleted from the input character string "disk" and the character string "esk" is input by a key operation of the key input device 16, for example. This case is similar to the case where the above-mentioned question making event due to deletion occurs. That is, as shown in (B) of FIG. 14, "disk [del] [del] [del]esk" is stored as the word state data 12e.

Since the word is short in this case, the CPU 11 makes a hidden word question in which one of the deleted characters is hidden. For example, as shown in (C) of FIG. 14, a hidden word question "d[ ]sk" is made in which the "e" at the character position of the head of the deleted characters (second character) is hidden.

The pronunciation of the character string corrected by the deletion is similar, and a mistake may be easily made. Therefore, an enhanced learning effect can be expected by making a hidden word question in which the corresponding character is hidden.

In the above-mentioned example, the voice recognition result is corrected by the key operation of the key input device 16, but if a character string entered by voice input is incorrect, voice input can be performed once again to correct the entered character string.

For example, let it be assumed that the utterance is intended to be "see", as shown in (A) of FIG. 15, but is recognized as "sea" by voice recognition processing and the characters are entered as such, as shown in (B) of FIG. 15. In this case, "see" can be entered by performing voice input once again, and information on the dictionary search result (sea) is displayed.

In this case, the CPU 11 compares "sea" first entered by voice recognition and shown in (B) of FIG. 15 with "see" which is to be a determined word, and a hidden word question "se[ ]" in which the different character is hidden can be made, as shown in (C) of FIG. 15, in the same manner as in the above-mentioned case where no question making event occurs.

Thus, by comparing words of similar pronunciations with each other and making a hidden word question based on the comparison, an enhanced learning effect can be expected for words of similar pronunciations and different spellings.

In the above description, reference was made to the case where a hidden word question is made, but a multiple choice question can be made as well.

Figure 16:
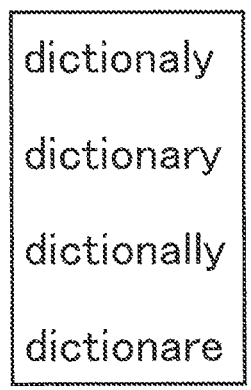
FIG. 16 is a diagram showing an example of choices displayed in a multiple choice question.

For example, let it be assumed that a question making event due to deletion occurs and "dictionaly[del] [del]ry" is stored as word state data 12e, as shown in (C) of FIG. 11. As a multiple choice question, the CPU 11 makes a plurality of options (four options in this example), as shown in FIG. 16. For example, the CPU 11 selects the correct determined word "dictionary" and the erroneously entered word "dictionaly" as options. Further, the CPU 11 generates similar words in which the characters at the deleted character positions are changed as options. For example, "dictionally" and "dictionare" are generated in which the characters at the deleted character positions are changed. For the generation of similar words, for example, a word transformation rule can be registered in advance for a plurality of words, and the determined word "dictionary" can be changed in part based on the rule. Data on the choices (a plurality of words) used for a multiple choice question is stored as the word question data 12g.

In this manner, the electronic dictionary 10 of the present embodiment can make not only a fill-in-the-blank question but also a multiple choice question.

The CPU 11 of the electronic dictionary 10 makes a fill-in-the-blank question or a multiple choice question, as described above, and thereafter when the learner instructs the transition to the learning mode, the CPU 11 executes the question providing program 12b2 and transitions to the learning mode.

In the learning mode, CPU 11 refers to the word question data 12g, causes the touch panel display 17 to display the question made based on the processing results of the dictionary search function, and prompts the user to enter correct data. For example, in the case of a fill-in-the-blank question, a correct character is entered for a hidden character. The CPU 11 determines whether the entered character is the correct character and outputs a determination result. In the case of a multiple choice question, a list of options is displayed, and the user is prompted to select the correct word. The CPU 11 determines whether the selected option is the correct word and outputs a determination result.

With respect to the questions to be asked, it is possible to designate question making conditions, such as "wrong questions in the current day" and "wrong questions in the past week". The CPU 11 can extract a question corresponding to the designated question making condition, based on the date and time data of the word question data 12g, and can present the extracted question.

As a result, the learner can narrow down the learning targets by using the question, and effective learning can be performed.

As described above, questions stored as the word question data 12g are made by using the processing results of the dictionary search function executed by the learner who uses the electronic dictionary 10. Therefore, the questions can be dynamically changed in accordance with how the learner uses the dictionary search function. Thus, it is possible to provide questions which the learner does not easily get tired of. In addition, since the questions are made based on the situations of the input operation performed by the learner, such as erroneous input, deletion of characters, occurrence of non-input time, the questions are suitable for the learner to learn and ensure a high learning effect for each learner.

The methods described in connection with the embodiment, that is, the processing methods illustrated in the flowcharts of FIGS. 4 and 5, can be realized as a program executable by a computer and can be stored and distributed in the form of a recording medium such as a memory card (ROM card, RAM card, etc.), a magnetic disk (a flexible disk, a hard disk, etc.), an optical disk (CD-ROM, DVD, etc.), a semiconductor memory, or the like. The computer reads the program recorded in an external recording medium, and the operation is controlled by this program, so that processing similar to the function described in connection with the embodiment can be realized.

The program data for realizing each method can be transmitted on a network (the Internet) as a form of program codes. The program data can be taken in from a computer connected to the network, and a function similar to that of the above-described embodiment can be realized.

The present invention is not limited to the above-mentioned embodiment, and can be reduced to practice by modifying the structural elements without departing from the spirit and scope of the invention. Further, the above-described embodiment includes inventions of various stages, and a variety of inventions can be derived by properly combining the structural elements disclosed in connection with the embodiment. For example, if the object of the invention is achieved and the advantages of the invention are attained even after some of the structural elements disclosed in connection with the embodiment are deleted or after some of the structural elements are combined, the structure made up of the resultant structural elements can be extracted as an invention.

The invention claimed is:

1. An information processing apparatus comprising:
a dictionary storage that stores headwords and dictionary contents associated with information corresponding to the headwords;
an input device that inputs a character string in accordance with an input operation by a user; and
a processor configured to generate, as a question to present to the user to assist in learning the character string, a fill-in-the-blank question including a hidden word in which at least one character of the character string is hidden,
wherein:
the processor is configured to generate the question based on (i) the character string entered to the input device as a search target for a headword of the dictionary contents, and (ii) contents of the input operation by the user when entering the character string to the input device, and
when the contents of the input operation include an operation of deleting an inputted character, the hidden word is generated by hiding a character located at a position in the hidden word corresponding to a position of the inputted character deleted during the input operation, or when the contents of the input operation indicate a situation where input of a character required more than a predetermined amount of time, the hidden word is generated by hiding a character located at a position in the hidden word corresponding to a position of the character the input of which required more than the predetermined amount of time.

2. The information processing apparatus according to claim 1, wherein when the contents of the input operation by the user include an input entry error such that the character string entered to the input device does not exist as one of the headwords in the dictionary content, the hidden word is generated by hiding a character located at a position in the hidden word corresponding to a position of a character erroneously entered during the input operation.

3. The information processing apparatus according to claim 1, wherein the processor is configured to:
execute a search for the headword of the dictionary contents based on a first character string input by the input device, and control to display information corresponding to the first character string on a display,
execute a search for the headword of the dictionary contents based on a second character string input by the input device, and control to display information corresponding to the second character string on the display, and
generate the hidden word by hiding a character located at a position in the hidden word corresponding to a position at which characters differ between the first character string and the second character string.

4. The information processing apparatus according to claim 1, wherein the processor is configured to:
generate at least one similar character string partially different from the character string; and
generate, as the question to present to the user, a multiple choice question including the character string and the similar character string.

5. An information processing method for an information processing apparatus, the information processing apparatus comprising a dictionary storage that stores headwords and dictionary contents associated with information corresponding to the headwords, and an input device that inputs a character string in accordance with an input operation by a user, and the information processing method comprising:

controlling the information processing apparatus to generate a question to present to the user to assist in learning the character string, the question being a fill-in-the-blank question including a hidden word in which at least one character of the character string is hidden, and the question being generated based on (i) the character string entered to the input device as a search target for a headword of the dictionary contents, and (ii) contents of the input operation by the user when entering the character string to the input device, wherein, when the contents of the input operation include an operation of deleting an inputted character, the hidden word is generated by hiding a character located at a position in the hidden word corresponding to a position of the inputted character deleted during the input operation, or when the contents of the input operation indicate a situation where input of a character required more than a predetermined amount of time, the hidden word is generated by hiding a character located at a position in the hidden word corresponding to a position of the character the input of which required more than the predetermined amount of time.

6. A non-transitory recording medium having a program recorded thereon that is executable by a computer comprising a dictionary storage that stores headwords and dictionary contents associated with information corresponding to the headwords, and an input device that inputs a character string in accordance with an input operation by a user, the program being executable to control the computer to:

generate a question to present to the user to assist in learning the character string, the question being a fill-in-the-blank question including a hidden word in which at least one character of the character string is hidden, and the question being generated based on (i) the character string entered to the input device as a search target for a headword of the dictionary contents, and (ii) contents of the input operation by the user when entering the character string to the input device, wherein, when the contents of the input operation include an operation of deleting an inputted character, the hidden word is generated by hiding a character located at a position in the hidden word corresponding to a position of the inputted character deleted during the input operation, or when the contents of the input operation indicate a situation where input of a character required more than a predetermined amount of time, the hidden word is generated by hiding a character located at a position in the hidden word corresponding to a position of the character the input of which required more than the predetermined amount of time.

\* \* \* \* \*